US008542364B1

(12) United States Patent
Keith et al.

(10) Patent No.: US 8,542,364 B1
(45) Date of Patent: Sep. 24, 2013

(54) SYSTEM TO REDUCE GYROSCOPIC ERRORS WITH LIMITED POWER SUPPLY QUALITY IN A FIBER OPTIC GYROSCOPE

(75) Inventors: Gregory W Keith, Glendale, AZ (US); Derek Mead, Scottsdale, AZ (US); Douglas E. Smith, Phoenix, AZ (US); Norman Gerard Tarleton, Glendale, AZ (US)

(73) Assignee: Honeywell International Inc., Morristown, NJ (US)

( * ) Notice: Subject to any disclaimer, the term of this patent is extended or adjusted under 35 U.S.C. 154(b) by 950 days.

(21) Appl. No.: 12/640,931

(22) Filed: Dec. 17, 2009

(51) Int. Cl.
*G01C 19/72* (2006.01)

(52) U.S. Cl.
USPC ........................................... 356/464; 356/460

(58) Field of Classification Search
USPC .............. 356/460, 461, 464, 483; 73/504.01, 73/504.02
See application file for complete search history.

(56) References Cited

U.S. PATENT DOCUMENTS

| 5,052,808 A * | 10/1991 | Hilby et al. | .................... 356/464 |
| 5,412,474 A | 5/1995 | Reasenberg et al. | |
| 7,333,209 B2 | 2/2008 | Greening et al. | |
| 7,950,281 B2 * | 5/2011 | Hammerschmidt | ....... 73/504.04 |
| 2008/0268804 A1 | 10/2008 | Salcido et al. | |
| 2009/0219105 A1 | 9/2009 | Sanduleanu et al. | |

OTHER PUBLICATIONS

Jing, Jin et al. "Electrical Crosstalk of Modulation Signal in Digital Closed-loop FOG". Acta Aeronautica et Astronautica Sinica, vol. 28, No. 5, Sep. 2007, pp. 1200-1205.*
Jing, Jin et al. "Random modulation for fiber optic gyroscope based on four-states Markov chain". Journal of Beijing University Aeronautics and Astronautics, vol. 34, No. 7, Jul. 2008, pp. 769-772.*
Karpe, "Spiral Inductors in IUHD for Voltage Controlled Oscillators in Configurable RF Integrated Circuits", Sep. 8, 2006, Publisher: Massachusetts Institute of Technology.

\* cited by examiner

*Primary Examiner* — Michael A Lyons
(74) *Attorney, Agent, or Firm* — Fogg & Powers LLC

(57) ABSTRACT

A fiber optic gyroscope includes a light source, an optical coupler in optical communication with the light source, with the optical coupler configured to receive an optical signal from the light source, an optical modulator in optical communication with the optical coupler, and a fiber optic coil in optical communication with the optical modulator. A demodulator is configured to receive an optical signal from the optical coupler and convert the optical signal to an electrical signal. A loop closure electronics module is configured to receive the electrical signal from the demodulator. A bias modulator is responsive to an output from the loop closure electronics module and is configured to output a modulation signal to the optical modulator. A first crosstalk filter network is operatively coupled to the demodulator, and a second crosstalk filter network is operatively coupled to the bias modulator.

20 Claims, 6 Drawing Sheets

US 8,542,364 B1

SYSTEM TO REDUCE GYROSCOPIC ERRORS WITH LIMITED POWER SUPPLY QUALITY IN A FIBER OPTIC GYROSCOPE

STATEMENT REGARDING FEDERALLY SPONSORED RESEARCH OR DEVELOPMENT

This invention was made with Government support under contract number FA9453-08-C-0263 awarded by Air Force Research Labs. The Government has certain rights in the invention.

BACKGROUND

An Interferometric Fiber Optic Gyroscope (IFOG), which utilizes counter-propagating electromagnetic waves in a fiber optic coil to sense rotation about the coil, can be susceptible to electronic noise. Such a fiber optic gyroscope uses a bias modulation to bias the gyroscope on a rate sensitivity portion of an interferogram. The bias modulation frequencies can couple into the demodulation circuitry and cause increased bias offset and deadband. For example, any coherent (in phase) noise that presents at the demodulation analog-to-digital converter is a source of error, affecting bias stability, bias offset, and size of gyroscope deadband.

While conventional IFOG electronics adequately filter out power supply noise and internal noise, such IFOG electronics require a grounding scheme with a quiet low impedance chassis ground connection as reference for the power supplies. While this approach works in a gimbaled sphere, where the gyroscopes are rotated using sliprings for power and data transmission, next generation inertial reference systems will not use sliprings, but instead will employ wireless technology for both data and power transmission. This wireless approach removes the chassis (earth) ground connection, and could allow the electronics to be susceptible to noise due to a floating power supply reference.

While it is possible to use separate power supplies for the bias modulation and corresponding demodulation circuitry, this is not practical mostly due to size and power dissipation increases. The size of both the external power supply and the internal circuitry from multiple separated power supplies would be prohibitive. Moreover, the extra power dissipation from multiple power supplies would also be a burden to the normally small system power budget. In addition, requiring an inertial reference system to provide power to the gyroscope with very low ripple voltage is not always practical.

SUMMARY

A fiber optic gyroscope includes a light source, an optical coupler in optical communication with the light source, with the optical coupler configured to receive an optical signal from the light source, an optical modulator in optical communication with the optical coupler, and a fiber optic coil in optical communication with the optical modulator. A demodulator is configured to receive an optical signal from the optical coupler and convert the optical signal to an electrical signal. A loop closure electronics module is configured to receive the electrical signal from the demodulator. A bias modulator is responsive to an output from the loop closure electronics module and is configured to output a modulation signal to the optical modulator. A first crosstalk filter network is operatively coupled to the demodulator, and a second crosstalk filter network is operatively coupled to the bias modulator.

DRAWINGS

The drawings depict only representative embodiments of the invention and are not to be considered limiting in scope. These embodiments will be described with additional specificity and detail in the following description through the use of the referenced drawings, in which.

DETAILED DESCRIPTION

In the following detailed description, embodiments are described in sufficient detail to enable those skilled in the art to practice the invention. It is to be understood that other embodiments may be utilized without departing from the scope of the invention. The following detailed description is, therefore, not to be taken in a limiting sense.

A system to reduce gyroscope errors with limited power supply quality in a fiber optic gyroscope, such as an Interferometric Fiber Optic Gyroscope (IFOG) is described herein. A filtering and grounding scheme is implemented in the fiber optic gyroscope to reduce or eliminate common mode and differential noise that couples from a bias modulation drive to demodulation circuitry.

The present system adds filtering for subcircuitry, isolating the modulating circuits from the demodulation circuits. The filtering can be both common mode and differential mode. At a minimum, power supply inputs to the demodulation circuitry have the filtering scheme. The present technique allows the power supply voltages to be noisier, and power supply ripple is much more difficult to couple into the gyroscope data.

The present approach solves the problem of a floating or noisy power supply input to the fiber optic gyroscope, and the lack of a quiet chassis ground reference, without a big size or power dissipation penalty. As such, high performance IFOG sensors can be operated using noisy switching power supplies with a missing or noisy chassis ground connection. This approach results in a reduction of coherent coupling in the IFOG sensor, with performance improvements to bias offset and gyro deadband.

Further details of the present system are described hereafter with reference to the drawings.

Figure 1:
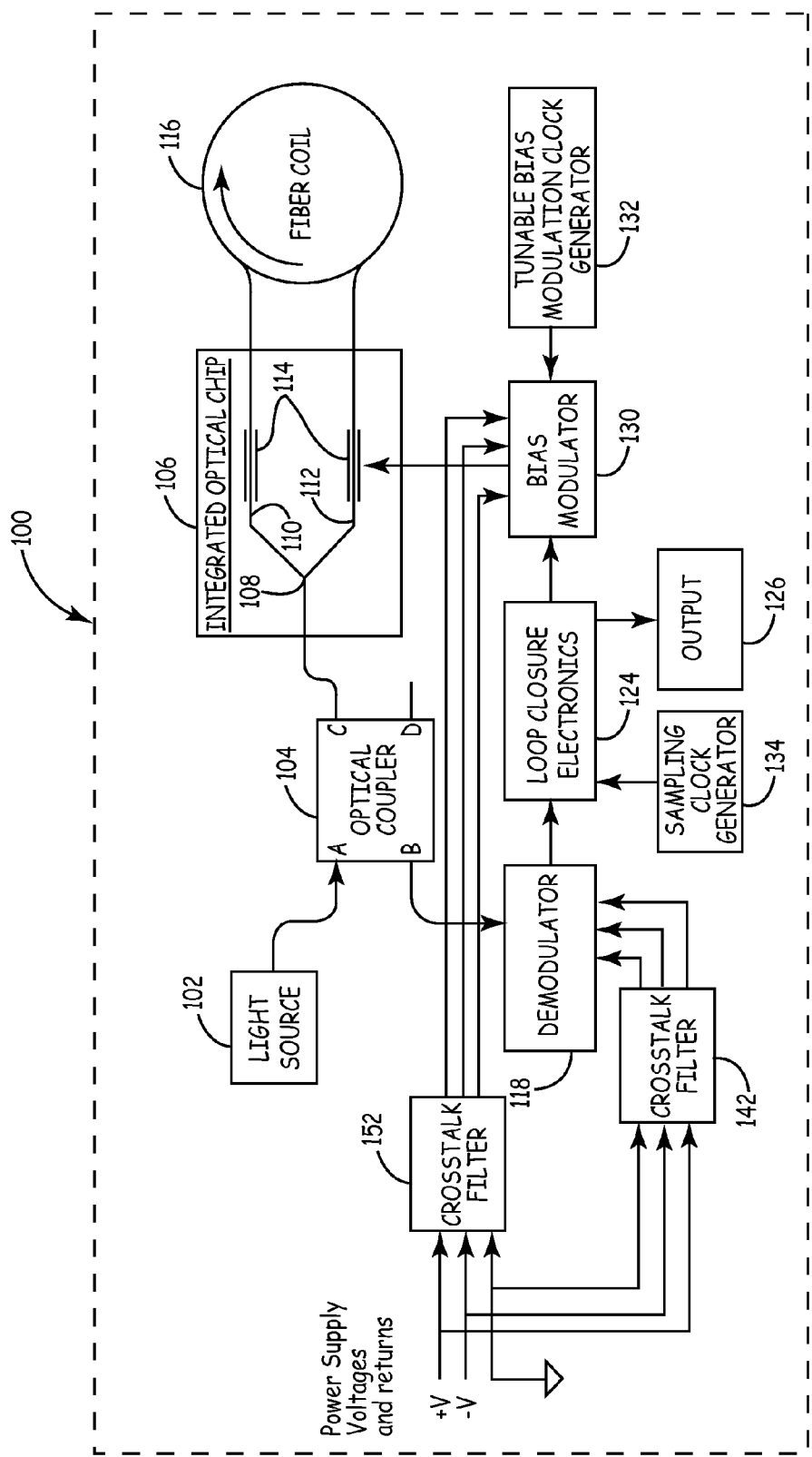
FIG. 1 is a block diagram of a fiber optic gyroscope implemented according to one embodiment.

FIG. 1 illustrates a fiber optic gyroscope (FOG) 100, such as an interferometer FOG, according to one embodiment. The FOG 100 generally includes a light source 102, an optical coupler 104, an optical modulator 106, a fiber optic coil 116, a demodulator 118, a loop closure electronics module 124, and a bias modulator 130. In addition, a crosstalk filter network 142 is coupled to demodulator 118, and a crosstalk filter network 152 is coupled to bias modulator 130. Each of these components is discussed in further detail as follows.

The light source 102 can be any suitable light source for propagating electromagnetic waves through FOG 100. For example, light source 102 can be a pump laser. The light source 102 is in optical communication with optical coupler 104 by using a suitable optical path such as an optical fiber.

The optical coupler 104 has light transmission media which extend between four ports A, B, C and D. Port A is connected to light source 102, port B is connected to the demodulator 118, and port C is coupled to optical modulator 106. In general, when optical coupler 104 receives electromagnetic waves at any of its ports, optical coupler 104 transmits the waves such that approximately half of the transmitted light appears at each of the two ports on the opposite end of the incoming port. At same time, substantially no electromagnetic waves are transmitted to the port which is at the same end as the incoming port. For example, light received at port A will be transmitted to ports C and D, but will not be substantially transmitted to port B. Similarly, light received at port C will be transmitted to ports A and B, but not to port D.

During operation, light source 102 transmits light to port A of optical coupler 104. The optical coupler 104 splits the transmitted light and provides the light to ports C and D. The light transmitted to port C is further transmitted to optical modulator 106 via an optical fiber or other suitable mechanism.

The optical modulator 106, which can be an integrated optical chip, includes a Y-junction 108 and a pair of waveguides 110, 112. Additionally, optical modulator 106 includes a plurality of optical phase modulator electrodes 114 integrated with the waveguides 110, 112. When light is transmitted to optical modulator 106, the light is further split at Y-junction 108 and fed to waveguides 110, 112. The light in wave guide 110 is transmitted to fiber optic coil 116, where it propagates clockwise around the length of fiber optic coil 116, and returns to wave guide 112. Likewise, the light in wave guide 112 is transmitted to fiber optic coil 116, where it propagates both clockwise and counter-clockwise around the length of fiber optic coil 116, and returns to wave guide 110 in optical coupler 106.

The fiber optic coil 116 is typically wound around a core and about an axis around which rotation is sensed. The fiber optic coil 116 provides a closed optical path in which the light propagates in opposite directions, ultimately impinging on a detector in demodulator 118. Rotation about the sensing axis in one direction causes an effective increase in the optical path length for one direction, and a decrease in the optical path length in the other direction. The optical path length difference introduces a phase shift between the light waves, a result known as the Sagnac effect.

After being transmitted from fiber optic coil 116 and passing through their respective wave guides, the light waves are combined at the Y-junction 108 and propagate to optical coupler 104. The combined light waves are then split and output to demodulator 118. The detector in demodulator 118 can be a photodetector, such as an appropriate photodiode and a suitable amplifier, or other suitable detector, which converts the optical signal of the light waves to an electrical signal. The detector outputs the electrical signal, which is proportional to the intensity of the two light waves impinging on the detector.

The electrical signal output from demodulator 118 is passed to loop closure electronics module 124. In general, loop closure electronics module 124 receives the current from the detector and drives optical modulator 106 to a feedback phase shift needed to keep a difference in intensity for two measurements of the interferometer at zero. Thus, the rotation rate measurement can be calculated from the feedback phase and delivered as an output 126.

When the two counter propagating waves impinge on the detector, the output from the detector follows the cosine of the phase difference between the two waves. The phase difference between the two waves is modulated with bias modulator 130. The bias modulator 130 introduces a phase bias modulation by applying a phase shift to the incoming and outgoing waves in the optical modulator 106. This modulation is achieved by applying a modulating voltage across electrodes 114 in optical modulator 106. The application of voltage lengthens or shortens the effective optical path length, thereby introducing an optical phase shift proportional to the applied voltage.

The bias modulation causes the detection points in the interferometer to shift, such that the detector no longer measures the intensity at the top of the interferometer, but rather at two offset points. The rotation rate, measured at the detector, is then proportional to the difference in the emitted intensity at the two offset points. The period of the bias modulation signal is tunable to half of the loop transit time of the light through the coil, such that the counter-propagating wave encounters the opposite modulation as the outgoing wave when it returns to optical modulator 106. When implemented, such a modulation scheme phase advances the incoming wave and retards the outgoing wave, such that the two waves interfere when combined at Y-junction 108.

The frequency of the bias modulation signal is controlled by a tunable bias modulation clock generator 132. The bias modulation clock generator 132 provides a clock signal with a frequency configured to cause the modulation of one of the counter-propagating waves to be 180 degrees out of phase with the modulation of the other. The bias modulation clock generator 132 allows the frequency to be accurately adjusted to compensate for variations in length of the optical fiber and the equivalent refractive index thereof.

As described above, the detector in demodulator 118 receives the waves from optical coupler 104 and provides an output current proportional to the intensity of the two waves. The output of demodulator 118 is passed to loop closure electronics 124. The loop closure electronics 124 samples the output of demodulator 118 to determine the intensity of the two waves. The sampling of the output of demodulator 118 is controlled by a sampling clock, which is created by a sampling clock generator 134. The sampling clock is selected to have a frequency that will result in the desired number of samples per half-period of the bias modulation clock.

A filtering and grounding scheme is implemented in FOG 100 to reduce or eliminate the common mode and differential mode noise that couples from the bias modulation circuitry to the demodulation circuitry, and from the power supplies to the demodulation circuitry and to the bias modulation circuitry. The filtering scheme is implemented with crosstalk filter network 142 being operatively coupled to demodulator 118, and crosstalk filter network 152 being operatively coupled to bias modulator 130. As shown in FIG. 1, power supply voltages and returns are also applied to crosstalk filter networks 142 and 152.

Figure 2:
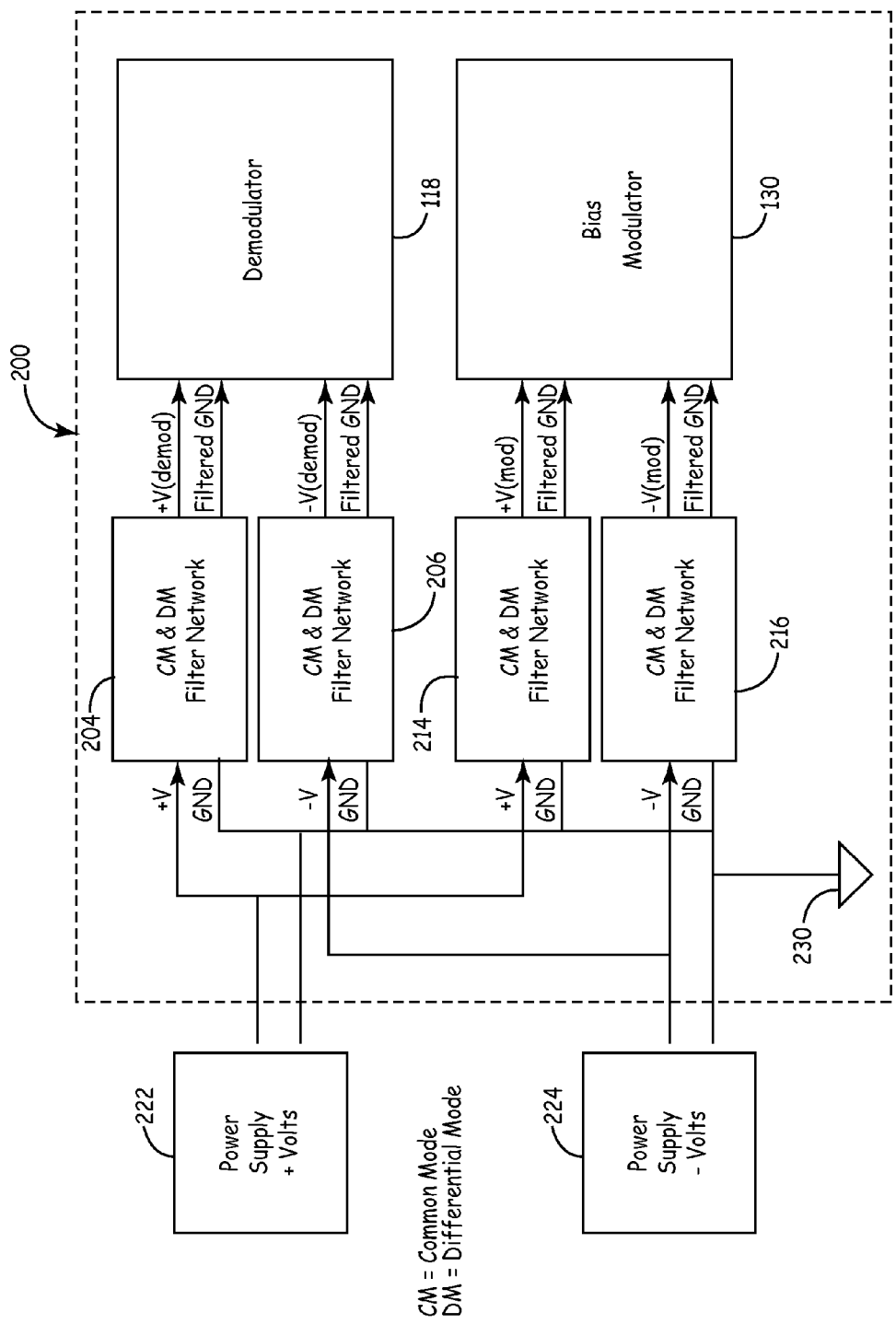
FIG. 2 is a block diagram of a filtering and grounding scheme for the fiber optic gyroscope of FIG. 1 according to one embodiment.

FIG. 2 illustrates further details of a filtering and grounding scheme 200 for the fiber optic gyroscope according to one embodiment, which implements the crosstalk filter networks. The crosstalk filter network coupled to demodulator 118 includes a pair of common mode and differential mode filter networks 204, 206. Likewise, the crosstalk filter network coupled to bias modulator 130 includes a pair of common mode and differential mode filter networks 214, 216. A power supply 222, which provides a positive voltage, is operatively coupled to filter network 204 and filter network 214. A power supply 224, which provides a negative voltage, is coupled to filter network 206 and filter network 216. Each of the filter networks is also connected to a common ground (GND) reference 230, and outputs a filtered ground to demodulator 118 or bias modulator 130. The filter networks 204, 206 output a positive and negative voltage, respectively, to demodulator 118. Likewise, filter networks 214 and 216 output a positive and negative voltage, respectively, to bias modulator 130.

Figure 3:
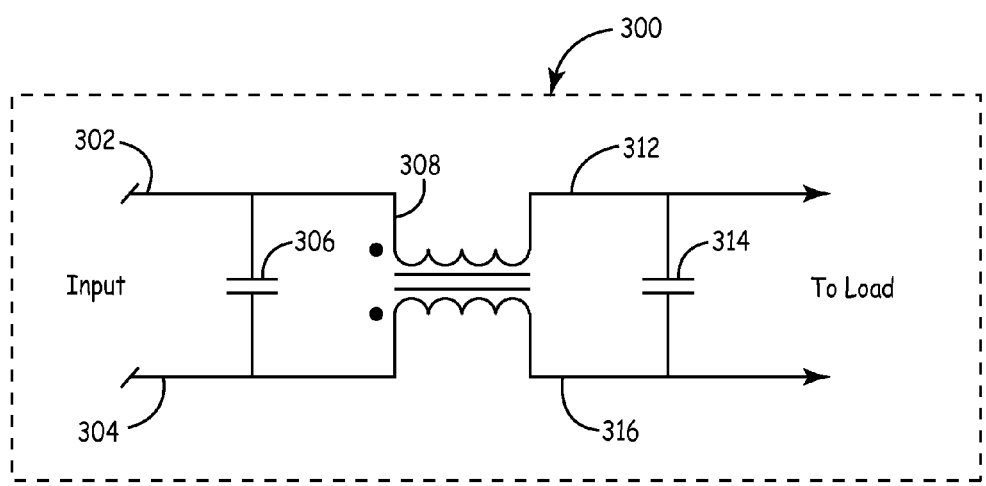
FIG. 3 illustrates a filter circuit according to one embodiment that can be implemented in the fiber optic gyroscope of FIG. 1.
Figure 4:
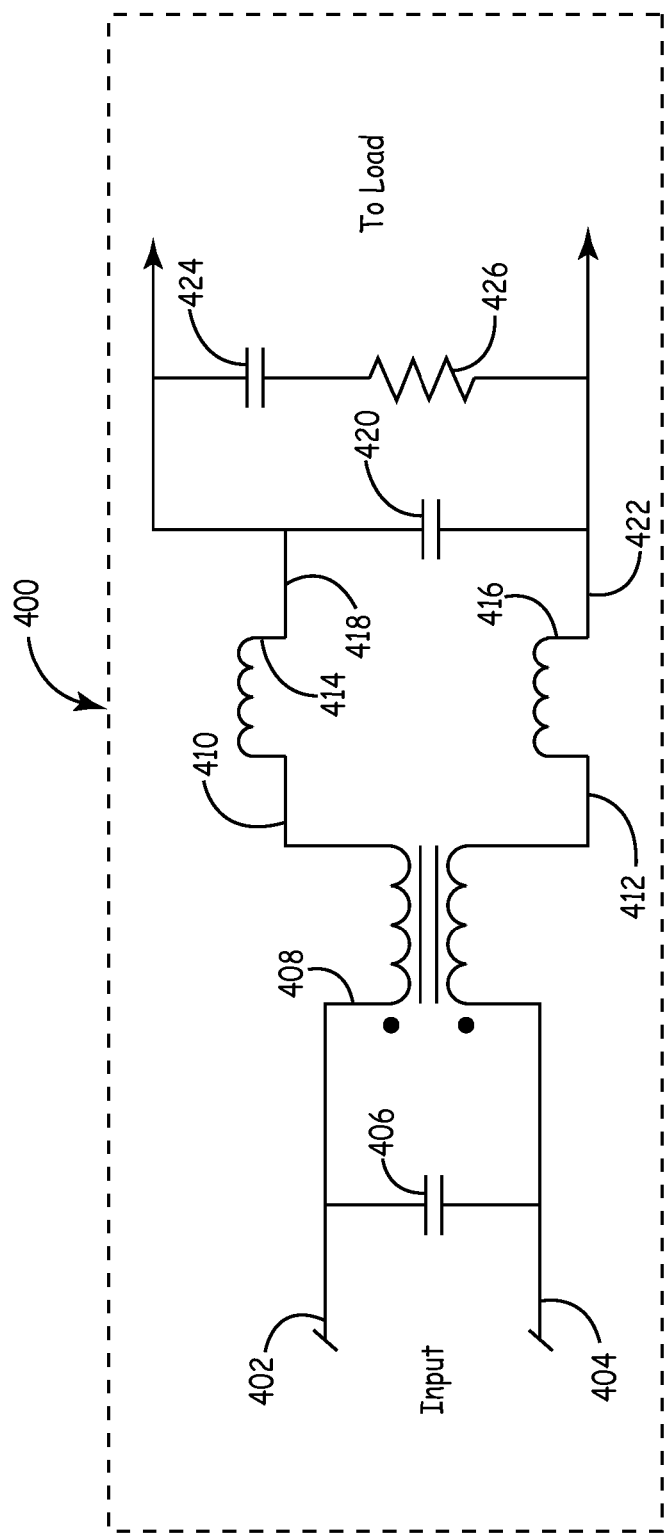
FIG. 4 illustrates a filter circuit according to another embodiment that can be implemented in the fiber optic gyroscope of FIG. 1.
Figure 5:
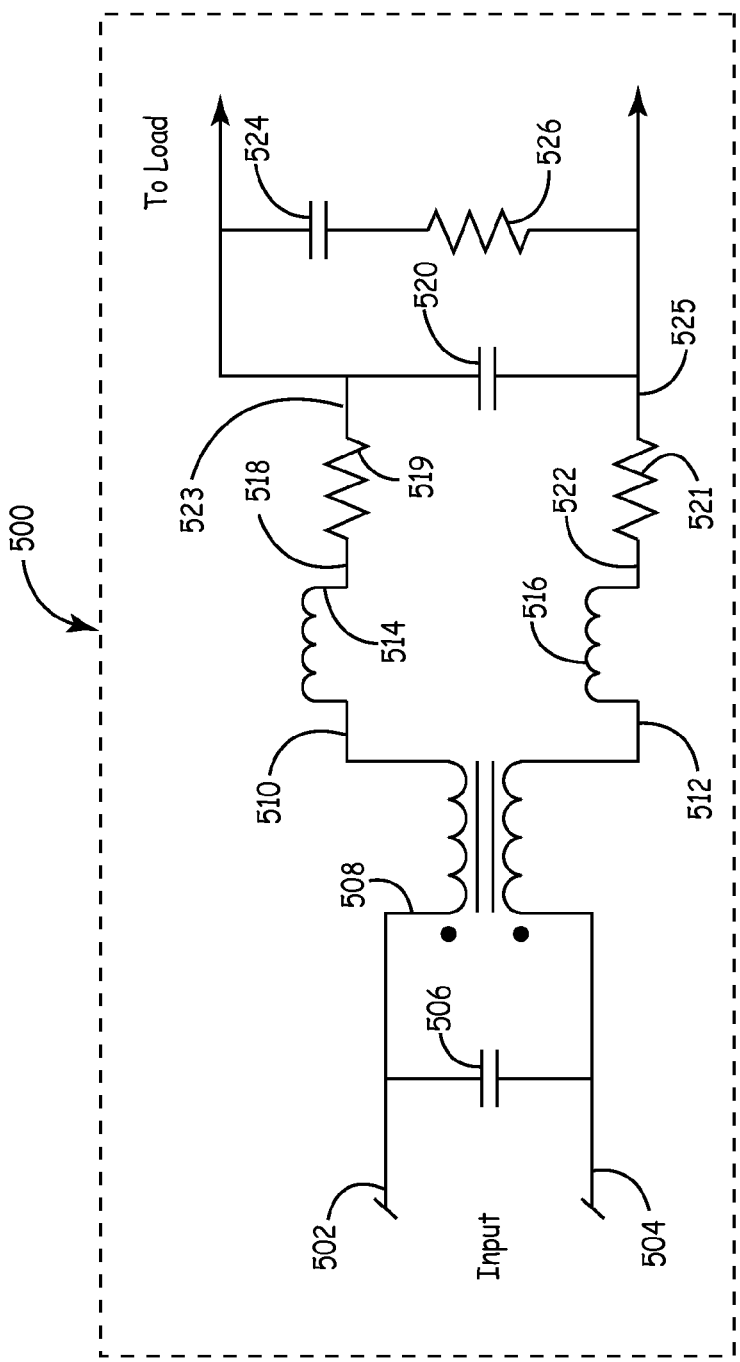
FIG. 5 illustrates a filter circuit according to a further embodiment that can be implemented in the fiber optic gyroscope of FIG. 1.

The common mode and differential mode filter networks can be implemented in various configurations, such as shown in FIGS. 3-5. For example, FIG. 3 illustrates a filter circuit 300 according to one embodiment that can be implemented in the filter networks of the fiber optic gyroscope. The filter circuit 300 includes a pair of input lines 302, 304 that are coupled to a first capacitor 306. The input lines 302 and 304 are also coupled to a first common mode choke 308. An output line 312 from common mode choke 308 is coupled to a second capacitor 314, and an output line 316 from common mode choke 308 is also coupled to capacitor 314. In addition, output lines 312 and 316 are also in communication with a load.

FIG. 4 illustrates a filter circuit 400 according to another embodiment, which can be implemented in the filter networks of the fiber optic gyroscope. The filter circuit 400 includes a pair of input lines 402, 404, which are coupled to a first capacitor 406. The input lines 402 and 404 are also coupled to a common mode choke 408. A first output line 410 from common mode choke 408 is coupled to a first inductor 414. A second output line 412 from common mode choke 408 is coupled to a second inductor 416. A first output line 418 from first inductor 414 is coupled to a second capacitor 420 and a third capacitor 424. A second output line 422 from second inductor 416 is coupled to second capacitor 420 and a resistor 426. The third capacitor 424 is coupled to resistor 426. The output lines 418 and 422 are also in communication with a load.

FIG. 5 illustrates a filter circuit 500 according to a further embodiment, which can be implemented in the filter networks of the fiber optic gyroscope. The filter circuit 500 includes a pair of input lines 502, 504, which are coupled to a first capacitor 506. The input lines 502 and 504 are also coupled to a common mode choke 508. A first output line 510 from common mode choke 508 is coupled to a first inductor 514. A second output line 512 from common mode choke 508 is coupled to a second inductor 516. A first output line 518 from first inductor 514 is coupled to a first resistor 519, and a second output line 522 from second inductor 516 is coupled to a second resistor 521. A first output line 523 from first resistor 519 is coupled to a second capacitor 520 and a third capacitor 524. A second output line 525 from second resistor 521 is coupled to second capacitor 520 and a third resistor 526. The third capacitor 524 is also coupled to third resistor 526. The output lines 523 and 525 are also in communication with a load.

As discussed previously, each of the filter networks in the fiber optic gyroscope is connected to a common ground reference. When two circuits share a common ground, the ground voltage of each circuit is affected by the ground current of the other circuit. When the power supply is connected to a stable ground reference (e.g., earth ground), the return currents for each filter circuit share a very small common impedance. In this case, low pass filters on the power supply high side can be used to prevent coherent noise from coupling between the filter circuits.

In some situations, the fiber optic gyroscope is implemented with floating power supplies, as a stable ground reference is not available (e.g., ships at sea or aircraft in flight). If the power supply is not connected to a stable reference, as in a floating power supply, the return currents for each filter circuit share a larger common impedance. In this scenario, the low pass filters on the power supply high side will not prevent coherent noise from coupling between the filter circuits through shared returns.

A floating ground for a fiber optic gyroscope can be managed by differentially filtering the power to the aggressor circuits (e.g., integrated optical chip and main digital circuits), or by differentially filtering power to the sensitive circuits (e.g., rate/input impedance (RIN)).

Common mode chokes can be used to reduce or eliminate the common mode and differential noise that couples from the bias modulation drive to the demodulation circuitry when a stable ground is not available. The common mode chokes keep return currents in separate paths to prevent coupling through common returns. The common mode chokes also provide for noise performance that is on par with stable ground performance.

Figure 6:
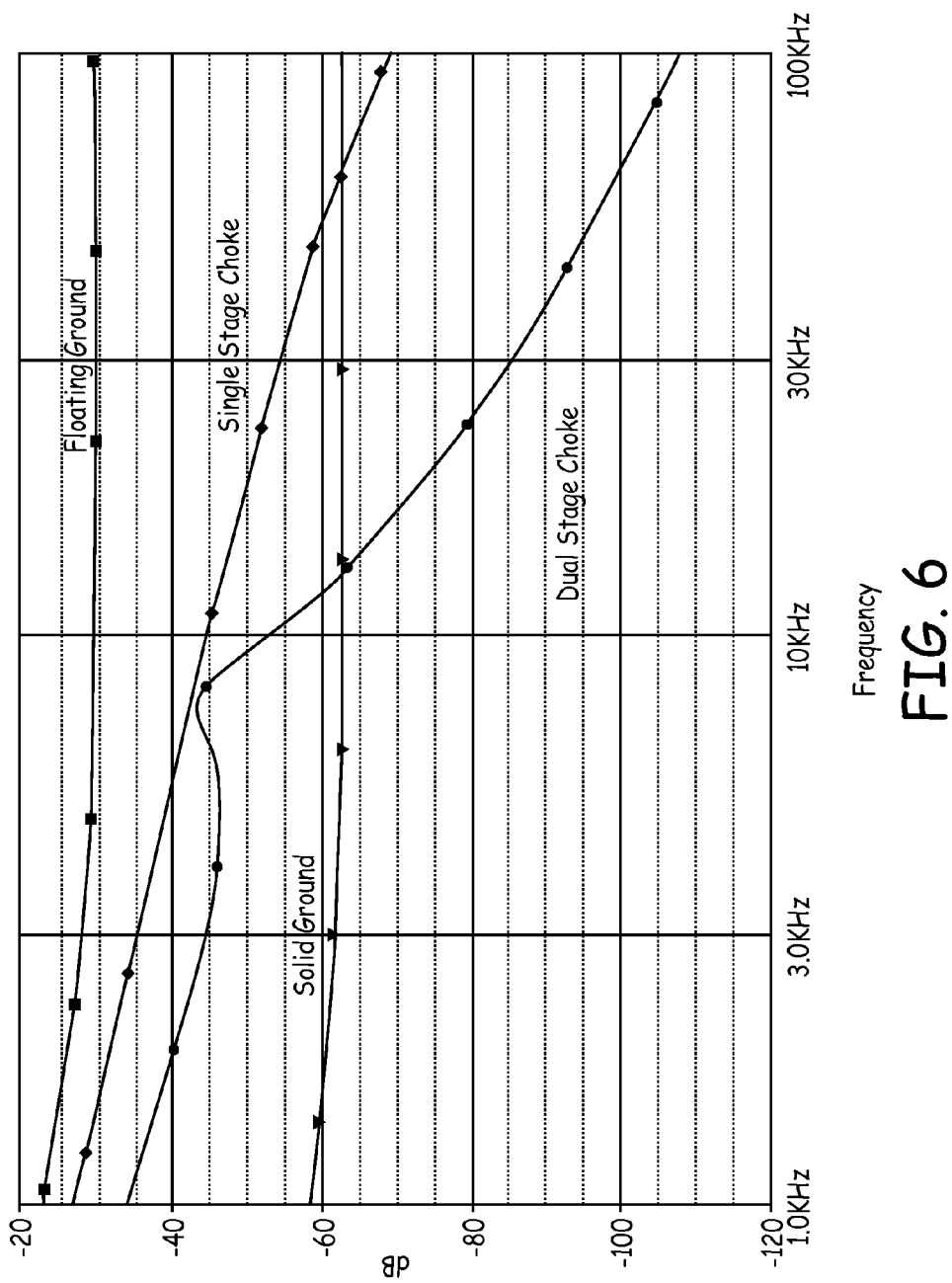
FIG. 6 is a graphical plot showing a comparison of various ground configurations for a fiber optic gyroscope.

FIG. 6 is a graphical plot showing a comparison of various ground configurations for a fiber optic gyroscope, including: a solid ground, a floating ground, a single stage choke, and a dual stage choke. A "single stage choke" refers to filtering on either the bias modulator power, or the demodulator power, but not both. A "dual stage choke" refers to filtering on both the bias modulator power and the demodulator power. As indicated in the plot, at 20 kHz a solid ground can reduce noise as compared to a floating ground by over 30 decibels (dB). The single stage choke can cut the noise at 20 kHz experienced with the floating ground by about 15 dB. The dual stage choke can cut the noise at 20 kHz about 45 dB below that of the floating ground, and 15 dB below that of the solid ground.

The present invention may be embodied in other specific forms without departing from its essential characteristics. The described embodiments are to be considered in all respects only as illustrative and not restrictive. The scope of the invention is therefore indicated by the appended claims rather than by the foregoing description. All changes that come within the meaning and range of equivalency of the claims are to be embraced within their scope.

What is claimed is:

1. A fiber optic gyroscope, comprising:
 a light source;
 an optical coupler in optical communication with the light source and configured to receive an optical signal from the light source;
 an optical modulator in optical communication with the optical coupler;
 a fiber optic coil in optical communication with the optical modulator;
 a demodulator configured to receive an optical signal from the optical coupler and convert the optical signal to an electrical signal;
 a loop closure electronics module configured to receive the electrical signal from the demodulator;
 a bias modulator responsive to an output from the loop closure electronics module and configured to output a modulation signal to the optical modulator;
 a first crosstalk filter network operatively coupled to the demodulator; and
 a second crosstalk filter network operatively coupled to the bias modulator.

2. The fiber optic gyroscope of claim 1, wherein the light source comprises a laser.

3. The fiber optic gyroscope of claim 1, wherein the optical modulator comprises an integrated optical chip.

4. The fiber optic gyroscope of claim 1, wherein the first crosstalk filter network comprises a first pair of common mode and differential mode filter networks.

5. The fiber optic gyroscope of claim 1, wherein second crosstalk filter network comprises a second pair of common mode and differential mode filter networks.

6. The fiber optic gyroscope of claim 1, further comprising a first power supply that provides a positive voltage to the first and second crosstalk filter networks.

7. The fiber optic gyroscope of claim 6, further comprising a second power supply that provides a negative voltage to the first and second crosstalk filter networks.

8. The fiber optic gyroscope of claim 1, wherein the first and second crosstalk filter networks are connected to a common ground reference.

9. The fiber optic gyroscope of claim 1, further comprising a sampling clock generator operatively coupled to the loop closure electronics module.

10. The fiber optic gyroscope of claim 9, further comprising a tunable bias modulation clock generator operatively coupled to the bias modulator.

11. The fiber optic gyroscope of claim 1, wherein the fiber optic gyroscope is a interferometric fiber optic gyroscope.

12. The fiber optic gyroscope of claim 1, wherein the first and second crosstalk filter networks include at least one filter circuit comprising:
 a first input line coupled to a first capacitor and a common mode choke;
 a second input line coupled to the first capacitor and the common mode choke;
 a first output line from the common mode choke coupled to a second capacitor; and
 a second output line from the common mode choke coupled to the second capacitor.

13. The fiber optic gyroscope of claim 1, wherein the first and second crosstalk filter networks include at least one filter circuit comprising:
 a first input line coupled to a first capacitor and common mode choke;
 a second input line coupled to the first capacitor and the common mode choke;
 a first output line from the common mode choke coupled to a first inductor;
 a second output line from the common mode choke coupled to a second inductor;
 a first output line from the first inductor coupled to a second capacitor and a third capacitor; and
 a second output line from the second inductor coupled to the second capacitor and a resistor, wherein the third capacitor is coupled to the resistor.

14. The fiber optic gyroscope of claim 1, wherein the first and second crosstalk filter networks include at least one filter circuit comprising:
 a first input line coupled to a first capacitor and a common mode choke;
 a second input line coupled to the first capacitor and the common mode choke;
 a first output line from the common mode choke coupled to a first inductor;
 a second output line from the common mode choke coupled to a second inductor;
 a first output line from the first inductor coupled to a first resistor;
 a second output line from the second inductor coupled to a second resistor;
 a first output line from the first resistor coupled to a second capacitor and a third capacitor; and
 a second output line from the second resistor coupled to the second capacitor and a third resistor, wherein the third capacitor is coupled to the third resistor.

15. The fiber optic gyroscope of claim 1, wherein the first and second crosstalk filter networks each comprise at least one single stage choke circuit for a floating ground.

16. The fiber optic gyroscope of claim 1, wherein the first and second crosstalk filter networks each comprise at least one dual stage choke circuit for a floating ground.

17. An interferometric fiber optic gyroscope, comprising:
 a laser light source;
 an optical coupler in optical communication with the laser light source and configured to receive an optical signal from the laser light source;
 an integrated optical chip in optical communication with the optical coupler;
 a fiber optic coil in optical communication with the integrated optical chip;
 a demodulator configured to receive an optical signal from the optical coupler and convert the optical signal to an electrical signal;
 a loop closure electronics module configured to receive the electrical signal from the demodulator;
 a bias modulator responsive to an output from the loop closure electronics module and configured to output a modulation signal to the integrated optical chip;
 a first crosstalk filter network operatively coupled to the demodulator, the first crosstalk filter network comprising a first pair of common mode and differential mode filter networks; and
 a second crosstalk filter network operatively coupled to the bias modulator, the second crosstalk filter network comprising a second pair of common mode and differential mode filter networks.

18. The fiber optic gyroscope of claim 17, wherein the first and second crosstalk filter networks are connected to a common ground reference.

19. The fiber optic gyroscope of claim 17, wherein the first and second crosstalk filter networks each comprise at least one single stage choke circuit for a floating ground.

20. The fiber optic gyroscope of claim 17, wherein the first and second crosstalk filter networks each comprise at least one dual stage choke circuit for a floating ground.

* * * * *